US012237633B2

(12) United States Patent
Zou et al.

(10) Patent No.: US 12,237,633 B2
(45) Date of Patent: Feb. 25, 2025

(54) CONNECTOR

(71) Applicant: Tyco Electronics (Shanghai) Co. Ltd., Shanghai (CN)

(72) Inventors: Yang (Leon) Zou, Shanghai (CN); Liming (Eric) Wang, Shanghai (CN); Xinxin (Daisy) Li, Shanghai (CN); Zebin (Donnie) Tang, Shanghai (CN); Feng (Will) Chen, Shanghai (CN)

(73) Assignee: Tyco Electronics (Shanghai) Co., Ltd., Shanghai (CN)

( * ) Notice: Subject to any disclaimer, the term of this patent is extended or adjusted under 35 U.S.C. 154(b) by 190 days.

(21) Appl. No.: 17/880,783

(22) Filed: Aug. 4, 2022

(65) Prior Publication Data

US 2023/0044221 A1 Feb. 9, 2023

(51) Int. Cl.

*H01R 4/2425* (2018.01)
*H01R 4/2495* (2018.01)
*H01R 13/516* (2006.01)

(52) U.S. Cl.

CPC ......... *H01R 4/2425* (2013.01); *H01R 4/2495* (2013.01); *H01R 13/516* (2013.01)

(58) Field of Classification Search

CPC ............ H01R 13/6581; H01R 13/5205; H01R 4/2425; H01R 4/2495; H01R 13/516; H01R 4/2452; H01R 9/223; H01R 4/2433; H01R 13/5816

See application file for complete search history.

(56) References Cited

U.S. PATENT DOCUMENTS 6,062,895 A * 5/2000 Lin ...................... H01R 4/2429 439/404
2009/0142968 A1* 6/2009 Goodrich ............. H01R 13/501 439/676

FOREIGN PATENT DOCUMENTS

CN 1947307 A * 4/2007 ........... H01R 13/453
EP 1793452 A2 * 6/2007 ........... H01R 4/2429

* cited by examiner

*Primary Examiner* — Jean F Duverne
(74) *Attorney, Agent, or Firm* — Barley Snyder

(57) ABSTRACT

A connector comprises a housing including an upper casing defining an aperture through which a wire is adapted to extend, and a lower casing defining a chamber receiving the upper casing. The chamber defines an opening that opens toward the upper casing. The upper casing is movable relative to the lower casing upon the exerting of a force on the upper casing such that the aperture and the opening at least partially overlap. A conductive terminal is disposed in the chamber of the lower casing and is adapted to tear an outer insulation of the wire arranged within the chamber to electrically connect to a conductor of the wire as the upper casing is moved toward the lower casing.

20 Claims, 4 Drawing Sheets

CONNECTOR

CROSS-REFERENCE TO RELATED APPLICATIONS

This application claims the benefit of Chinese Patent Application No. 202110895953.9 filed on Aug. 5, 2021, the whole disclosure of which is incorporated herein by reference in its entirety.

FIELD OF THE INVENTION

The disclosure relates to a wire connector and, more particularly, to an insulation displacement connector

BACKGROUND

Insulation displacement technology is widely used to connect a wire to a corresponding conductive terminal of a connector, and the wire-to-wire connection is achieved by the connector itself tearing the outer insulation of the wire to realize the contact between the conductive terminal and the electrical conductor portion. This eliminates the process of stripping the outer insulation of the wire. For example, an existing IDC (Insulation Displacement Connector) includes an insulating housing composed of an upper casing and a lower casing. A wire insertion aperture (e.g., a circular hole) is provided in the lower casing, and the wire is inserted into the wire insertion aperture and passes through the conductive terminal disposed in the lower casing. By pressing down the upper casing, the wire is driven downward such that the conductive terminal tears the outer insulation of the wire and contacts with the electrical conductor part of the wire to achieve conduction. However, the position of the insertion aperture determines a higher overall height of the product when used, which makes the product's external dimensions too large, restricts the application scenarios (for example, high requirement for installation space), and increases manufacturing cost of the product.

SUMMARY

A connector according to an embodiment of the present disclosure comprises a housing including an upper casing defining an aperture through which a wire is adapted to extend, and a lower casing defining a chamber receiving the upper casing. The chamber defines an opening that opens toward the upper casing. The upper casing is movable relative to the lower casing upon the exerting of a force on the upper casing such that the aperture and the opening at least partially overlap. A conductive terminal is disposed in the chamber of the lower casing and is adapted to tear an outer insulation of the wire arranged within the chamber to electrically connect to a conductor of the wire as the upper casing is moved toward the lower casing.

BRIEF DESCRIPTION OF THE DRAWINGS

The invention will now be described by way of example with reference to the accompanying Figures, of which.

DETAILED DESCRIPTION OF THE EMBODIMENTS

Figure 1:
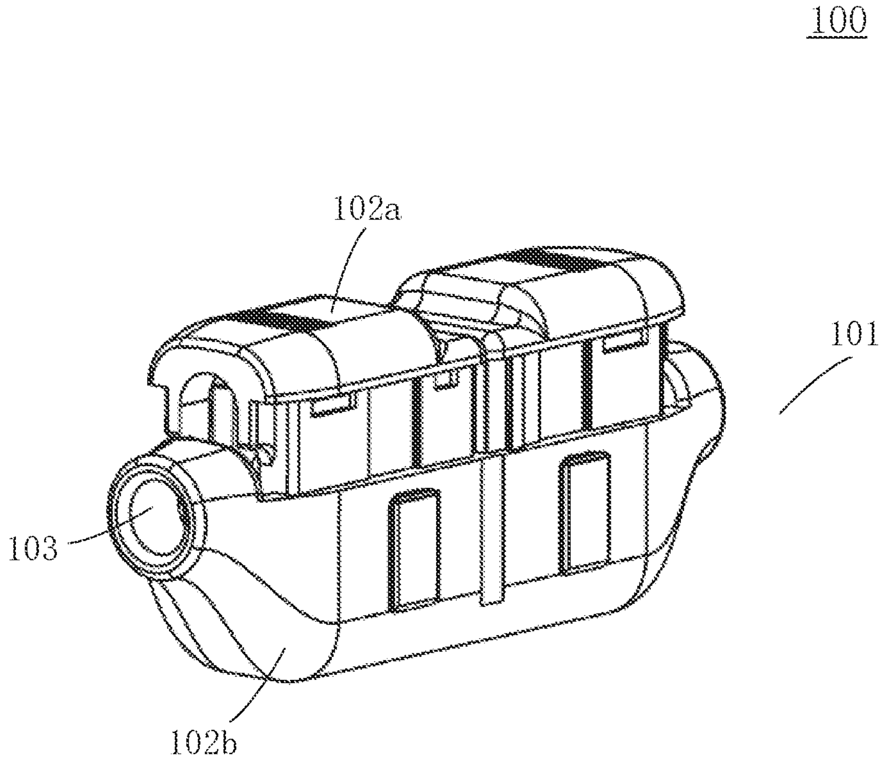
FIG. 1 (Prior Art)
FIG. 1 is a schematic view of an example connector according to the prior art.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
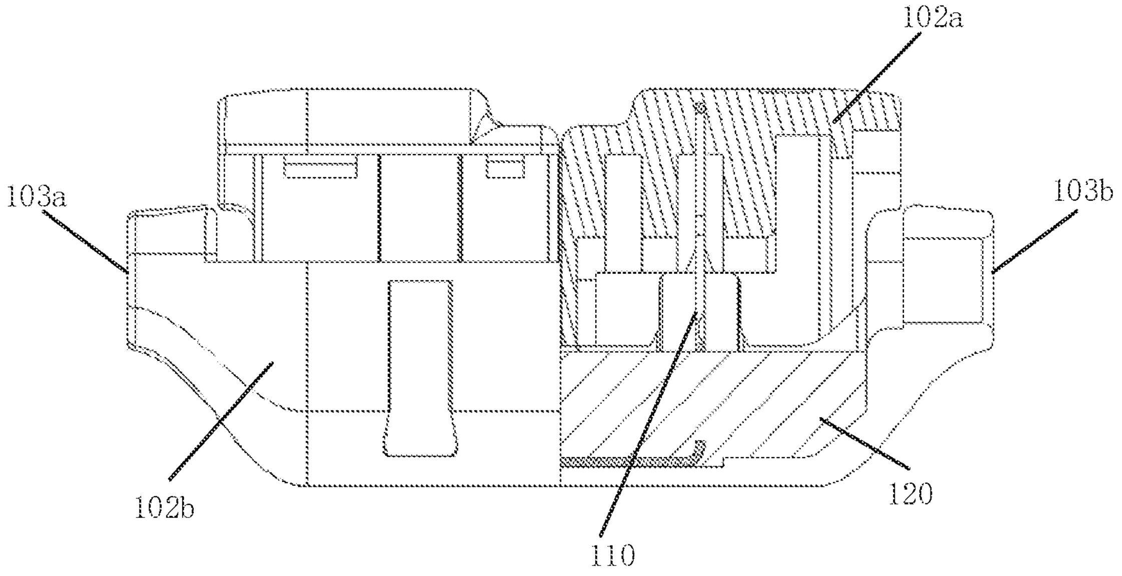
FIG. 2 (Prior Art)
FIG. 2 is a side view of the connector of FIG. 1.

FIGS. 1 and 2 illustrate a schematic perspective view and a side view, respectively, of an example IDC connector 100 according to the prior art. Referring to FIG. 1, the connector 100 includes an insulating housing 101 composed of an upper casing 102*a* and a lower casing 102*b*. A wire insertion aperture 103, which includes a pair of insertion apertures 103*a* and 103*b*, is provided in the lower casing 102*b*, and a wire is inserted into the wire insertion aperture 103 and passes through the conductive terminal 110 disposed in the lower casing 102*b*. By pressing down the upper casing 102*a* to move downward relative to the lower casing 102*b*, the wire is driven downward such that the conductive terminal 110 tears the outer insulation of the wire and contacts with the electrical conductor part of the wire to achieve conduction. However, as shown in FIGS. 1 and 2, the position of the insertion aperture determines a higher overall height of the product when used, which makes the product's external dimensions too large, restricts the application scenarios (for example, high requirement for installation space), and increases manufacturing cost of the product. In addition, a sealing material 120 (e.g., a gel or other paste-like or slurry-like sealing material, etc.) is usually poured into a space between the pair of insertion apertures 103*a* and 103*b* of the lower casing 102*b*, so that the exposed conductor portion of the wire is sealed from the pair of insertion apertures 103*a* and 103*b*, for example, to achieve a waterproof seal. However, the position of the wire insertion aperture determines that more sealing material needs to be poured to achieve good sealing effect.

Figure 3:
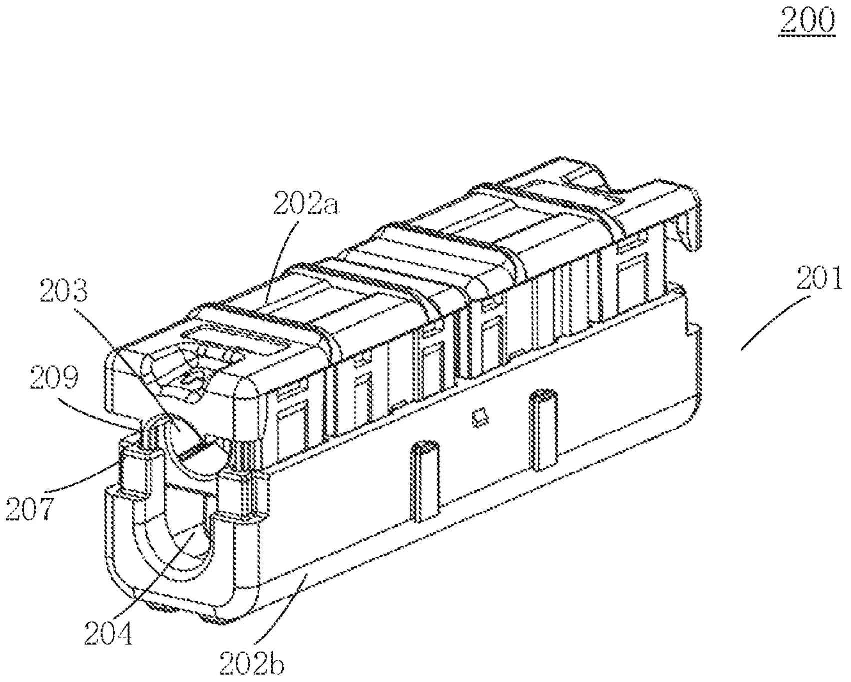
FIG. 3 is a schematic perspective view of an example connector according to the embodiments of the disclosure.
Figure 6:
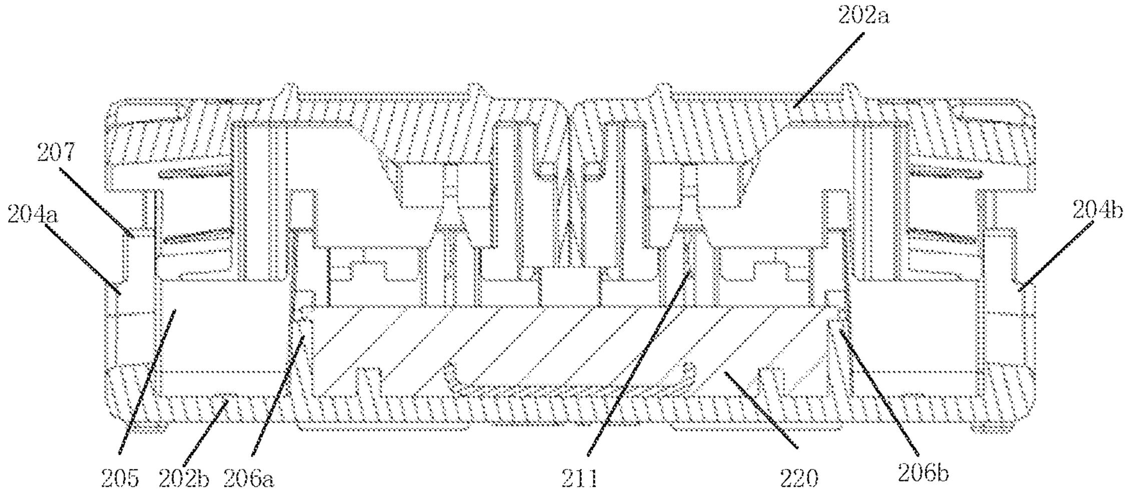
FIG. 6 is a side view of the connector of FIG. 3.
Figure 7:
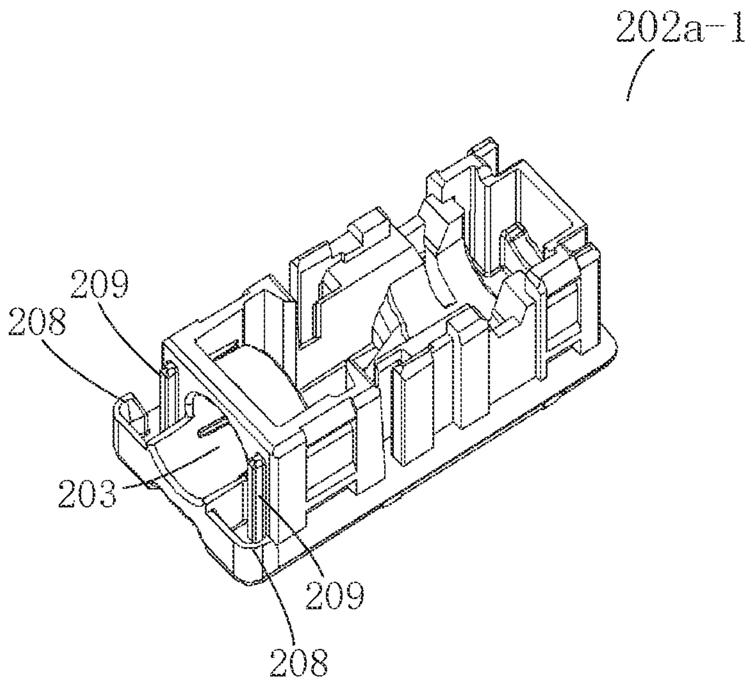
FIG. 7 is a schematic perspective view of part of an example upper casing of the connector of FIG. 3.
Figure 8:
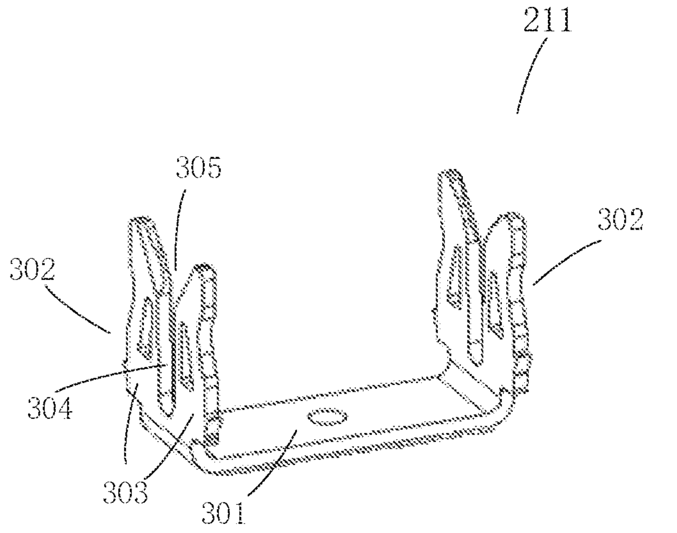
FIG. 8 is a schematic perspective view of an example conductive terminal of the connector of FIG. 3.

In view of the above shortcomings of the existing IDC connector, this invention provides an IDC having a different structure. FIG. 3 illustrates a schematic perspective view of an example IDC connector 200 according to the embodiments of the disclosure, FIG. 4 illustrates a perspective exploded view of the connector 200 of FIG. 3, FIG. 5 illustrates a schematic perspective view of an example lower casing of the connector 200 of FIG. 3, FIG. 6 illustrates a side view of the connector 200 of FIG. 3, FIG. 7 illustrates a schematic perspective view of part of an example upper casing of the connector 200 of FIG. 3, and FIG. 8 illustrates a schematic perspective view of an example conductive terminal of the connector 200 of FIG. 3.

Figure 4:
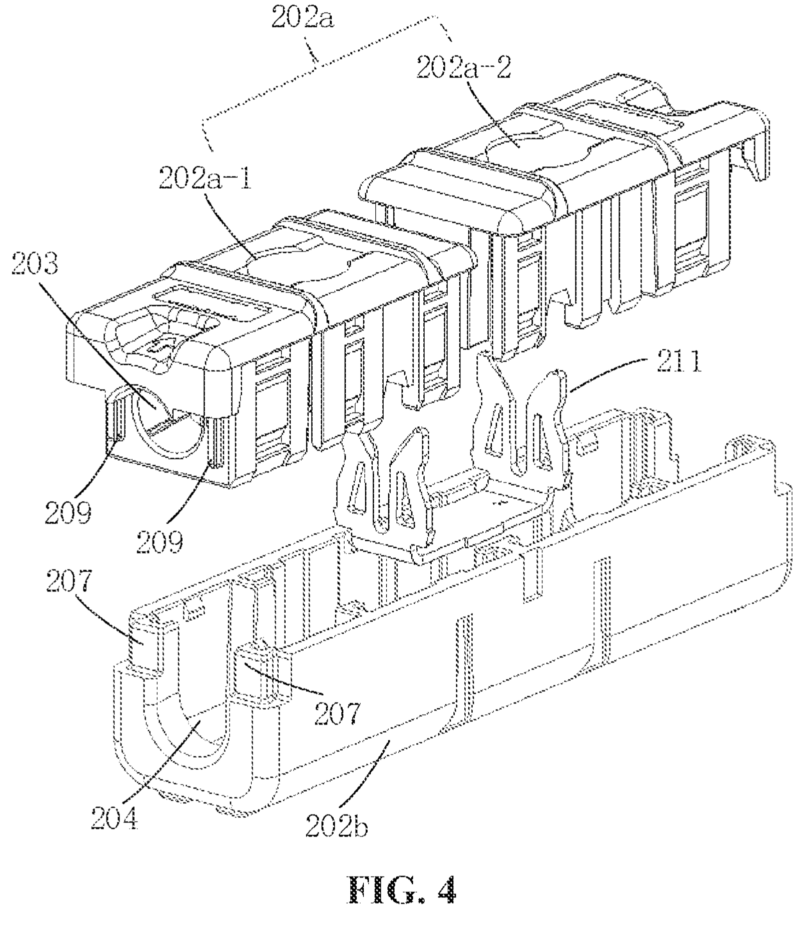
FIG. 4 is a perspective exploded view of the connector of FIG. 3.
Figure 5:
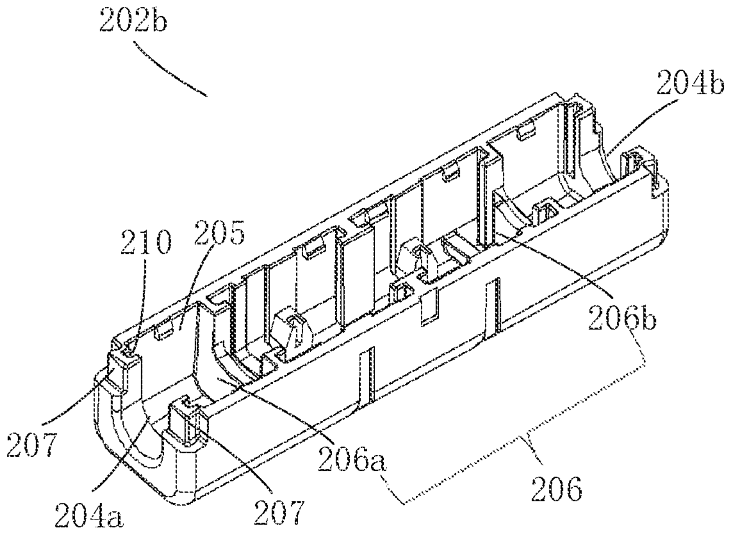
FIG. 5 is a schematic perspective view of an example lower casing of the connector of FIG. 3.

Referring to FIGS. 3-5, the example IDC connector 200 includes an insulating housing 201 composed of an upper casing 202*a* and a lower casing 202*b*. The upper casing 202*a* includes an aperture 203 through which a wire is adapted to extend. The lower casing 202*b* includes a chamber 205 for receiving the upper casing 202*a* and the chamber 205 defines an opening 204 (e.g., a U-shaped opening, etc.) that opens toward the upper casing 202*a*. The connector 200 further includes a conductive terminal 211 disposed within the chamber 205 of the lower casing 202*b*. The upper casing 202*a* is movable relative to the lower casing 202*b* upon the exerting of a force on the upper casing 202*a*, such that the aperture 203 and the opening 204 at least partially overlap and the conductive terminal 211 can tear the outer insulation of the wire to connect to a conductor of the wire.

Compared with the existing connector 100, the wire insertion aperture 203 is disposed in the upper casing 202*a*, so that the position of the wire insertion aperture 203 no longer becomes a factor affecting the dimensions of the product. This may significantly reduce the height of the connector and thus reduce the volume of the product after the upper casing 202*a* and the lower casing are assembled together. Lower height means less material and therefore lower cost.

Because the wire insertion aperture 203 is provided in the upper casing 202*a* and the lower casing 202*b* includes an opening 204 that is open, this opening 204 causes the strength of the lower casing 202*b* to be weakened after the lower casing 202*b* is deformed by force, especially when the lower case 202*b* is inserted into the upper casing 202*a* after being pressed. As such, the lower case 202*b* may be provided with at least one reinforcing bar to enhance the strength of the lower case 202*b*.

In some embodiments, as shown in FIG. 5, at least one reinforcing bar 206 (which includes for example a first reinforcing bar 206*a* and a second reinforcing bar 206*b*) may be disposed on an inner surface of the lower casing 202*b* defined by the chamber 205 to enhance the strength of the lower casing 202*b*. The reinforcing bar 206 may define an open opening (e.g., a U-shaped opening) and the height of the opening may be higher than the height of the opening 204. For example, the reinforcing rib 206 may include a rib protruding from the bottom inner surface of the lower casing 202*b* and protrusions extending from the rib along the inner surface of both sides of the lower casing 202*b*, thereby forming, for example, a U-shaped opening. The height of the rib may be higher than the height of the opening 204 (i.e., the lowest distance of the opening 204 from the bottom inner surface of the lower casing 202*b*). In other embodiments, at least one reinforcing bar may also be disposed on an outer surface of the lower casing 202*b* to enhance the strength of the lower casing 202*b*.

As shown in FIGS. 5-6, the opening 204 includes a first opening 204*a* disposed at a first end of the low casing 202*b* and a second opening disposed at a second end of the lower casing 202*b*. In some embodiments, the at least one reinforcing bar 206 may include a first reinforcing bar 206*a* disposed adjacent to the first opening 204*a* and a second reinforcing bar 206*b* disposed adjacent to the second opening 204*b*. The conductive terminal 211 can be disposed within a space formed between the first reinforcing bar 206*a* and the second reinforcing bar 206*b*.

In other embodiments, the at least one reinforcing bar 206 may include a first reinforcing bar 206*a* disposed adjacent to the first opening 204*a*. The conductive terminal 211 can be disposed within a space formed between the first reinforcing bar 206*a* and the second opening 204*b*. In still other embodiments, the at least one reinforcing bar 206 may include a second reinforcing bar 206*b* disposed adjacent to the second opening 204*b*. The conductive terminal 211 can be disposed within a space formed between the second reinforcing bar 206*b* and the first opening 204*a*.

As shown in FIG. 6, according to one embodiment the space as described above can be filled with a sealing material 220 (e.g., a gel or other paste-like or slurry-like sealing material, etc.), so that after the upper casing 202*a* moves relative to the lower casing 202*b* to be accommodated in the chamber 205 of the lower casing 202*b* and the conductive terminal 211 tears the outer insulation of the wire to connect to the conductor of the wire, the sealing material 220 is compressed to seal the conductor of the wire and the conductive terminal 211 from the first opening 204*a* and the second opening 204*b*, for example, to achieve a waterproof seal. Compared with the connector 100 of FIG. 2, the sealing material 220 does not need to be fully filled between the first opening 204*a* and the second opening 204*b*, but only needs to be partially filled within the partial space between the first opening 204*a* and the second opening 204*b*. This partial space is formed by at least one reinforcing bar 206, which saves the sealing material used to seal the wire. For example, the first reinforcing bar 206*a* and the second reinforcing rib 206*b* may be disposed at one third (⅓) and two thirds (⅔) of the length of the lower casing 202*b* and the conductive terminal 211 may be provided at half (½) of the length of the lower casing 202*b*, then only the ⅓ of the length of the chamber 205 between the first reinforcing rib 206*a* and the second reinforcing rib 206*b* is filled with sealing material to achieve a seal.

In some embodiments, as shown in FIGS. 3-6, the lower casing 202*b* may further include at least one fixing structure 207 (as shown, two fixing structures are illustrated merely for purposes of example and not limitation) disposed at an open end of the opening 204. Accordingly, the upper casing 202*a* may include at least one accommodating cavity 208 for accommodating the at least one fixing structure 207, as shown in FIG. 7. When the upper casing 202*a* moves downward relative to the lower casing 202*b* upon being pressed, the fixing structure 207 of the lower casing 202*b* can be inserted into or accommodated within the fixing cavity 208, thereby to realize the fixation between the upper casing 202*a* and the lower casing 202*b*. For example, this fixation can prevent from separating the upper casing 202*a* from the lower casing 202*b* or prevent the upper casing 202*a* from failing off the lower casing 202*b* and vice versa.

The at least one fixing structure 207 may include two convergent inclined surfaces extending from the open end of the opening 204, and the at least one accommodating cavity 208 may include an inner surface to mate with the two inclined surfaces. For example, the fixing structure 207 may be a wedge-shaped fixing structure (e.g., a wedge-shaped Tenon such as dovetail) and the accommodating cavity 208 may be a wedge-shaped cavity (e.g., a wedge-shaped Mortise). Compared to a fixing structure with non-converging surfaces, by using a fixing structure with two converging inclined surfaces, the mutual cooperation between the fixing structure 207 of the lower casing 202*b* and the accommodating cavity 208 of the upper casing 202*a* can additionally enhance the structural strength of the open opening 204 of the lower casing 202*b*. For example, the opening 204 can be prevented from expanding outward when being deformed by an external force which may cause the snap-fit failure. That is, the structures of the upper and lower casings are engaged with each other so that the upper casing 202*a* and the lower casing 202*b* form a whole, which improves the overall structural strength and reliability of the product.

As shown in FIGS. 3-5 and 7, the at least one fixing structure 207 may further include a guide groove 210 formed between the two inclined surfaces and the upper casing 202*a* may include a guide post 209 adapted to be inserted into the guide groove 210. Through the cooperation between the guide post 209 and the guide groove 210, the guiding and alignment of the upper casing 202*a* relative to the lower casing 202*b* during the movement can be realized.

Referring to FIG. 8, the example conductive terminal 211 includes a body 301 and a pair of piercing portions 302 extending upward from opposite sides of the body 301 respectively. Each piercing portion 302 has a pair of piercing pieces 303, and a piercing clip slot 304 is formed between the pair of piercing pieces 303 to tear the outer insulation of the wire. The edge of the piercing clip slot 304 forms an inward opening 305 to accommodate the wire. For example, the wire may be received in the opening 305 of the pair of piercing portions 302 and then pressed into the piercing clip slot 304 by applying a force to the upper casing 202*a* of the connector 200 (e.g., pressing the upper casing 102*a*), then the conductor portion of the wire is in contact with the conductive terminal 211 at each piercing portion 302, thereby realizing the conduction of the wire.

In some embodiments, as shown in FIGS. 4 and 8, the upper casing 202*a* may include a first casing part 202*a*-1 and a second casing part 202*a*-2. The first casing part 202*a*-1 cooperates with one of the pair of piercing portions 302 of the conductive terminal 211, and the second casing part 202*a*-2 cooperates with the other one of the pair of piercing portions 302 of the conductive terminal 211. For example, FIG. 7 shows the structure of the first casing part 202*a*-1. For example, a wire can be inserted into the aperture 203 of the first casing part 202*a*-1, and the first casing part 202*a*-1 is pressed to move relative to the lower casing 202*b* such that the aperture 203 and the first opening 204*a* of the lower casing 202*b* at least partially overlap, and one piercing portion 302 of the conductive terminal 211 tears the outer insulation of the wire to connect to the conductor portion of the wire. Similarly, a wire can be inserted into the aperture of the second casing part 202*a*-2, and the second casing part 202*a*-2 is pressed to move relative to the lower casing 202*b* such that the aperture and the second opening 204*b* of the lower casing 202*b* at least partially overlap, and the other piercing portion 302 of the conductive terminal 211 tears the outer insulation of the wire to connect to the conductor portion of the wire. In some embodiments, the first casing part 202*a*-1 and the second casing part 202*a*-2 may be integrally or separately formed.

Compared with a connector in the prior art, the IDC connector described above with reference to FIGS. 3-8 has the following advantages: i) by integrating a wire insertion aperture in the upper casing, the overall height of the product after installation is not limited by the position of the wire insertion aperture, the size of the product is significantly reduced, the product can be applied to more scenarios (for example, installed in in space-constrained areas), and the cost is reduced; ii) by providing the lower casing with a reinforcing bar, this can not only enhance the strength of the lower casing, but also save the sealing material for sealing the wire; iii) by providing the lower and upper casings with a fixing structure and a accommodating cavity, this can realize the fixation of the product, guiding and alignment during the installation, enhance the structural strength of the opening of the lower casing, and prevent the snap-fit failure due to the lower casing expanding outward when being deformed by an external force.

In addition, those areas in which it is believed that those of ordinary skill in the art are familiar, have not been described herein in order not to unnecessarily obscure the invention described. Accordingly, it has to be understood that the invention is not to be limited by the specific illustrative embodiments, but only by the scope of the appended claims.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of the elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A connector, comprising:
- a housing including:
  - an upper casing defining an aperture through which a wire is adapted to extend; and
  - a lower casing defining a chamber receiving the upper casing, the chamber defining an opening that opens toward the upper casing, the upper casing movable relative to the lower casing upon the exerting of a force on the upper casing such that the aperture and the opening at least partially overlap; and
- a conductive terminal disposed in the chamber of the lower casing and adapted to tear an outer insulation of the wire arranged within the chamber to electrically connect to a conductor of the wire as the upper casing is moved toward the lower casing, the conductive terminal including:
  - a body; and
  - a pair of piercing portions extending upward from opposite sides of the body, each pair of piercing portions including a pair of piercing pieces and a piercing clip slot formed between the pair of piercing pieces to tear the outer insulation of the wire.

2. The connector of claim 1, wherein the lower casing includes a reinforcing bar.

3. The connector of claim 2, wherein the reinforcing bar is disposed on an outer surface of the lower casing.

4. The connector of claim 2, wherein the reinforcing bar is disposed on an inner surface of the lower casing defined by the chamber.

5. The connector of claim 4, wherein the opening includes a first opening disposed at a first end of the lower casing and a second opening disposed at a second end of the lower casing.

6. The connector of claim 5, the reinforcing bar includes a first reinforcing bar disposed adjacent to one of the first opening or the second opening.

7. The connector of claim 6, wherein the conductive terminal is disposed within a space formed between the first reinforcing bar and the other one of the first opening or the second opening.

8. The connector of claim 7, wherein the space is filled with a sealing material compressed by the upper casing and the lower casing and adapted to seal the conductor of the wire and the conductive terminal from the first opening and the second opening.

9. The connector of claim 5, wherein the reinforcing bar includes a first reinforcing bar disposed adjacent to the first opening and a second reinforcing bar disposed adjacent to the second opening.

10. The connector of claim 9, wherein the conductive terminal is disposed within a space formed between the first reinforcing bar and the second reinforcing bar.

11. The connector of claim 1, wherein the lower casing includes at least one fixing structure disposed at an open end of the opening and the upper casing includes at least one accommodating cavity for accommodating the at least one fixing structure.

12. The connector of claim 11, wherein the at least one fixing structure includes two convergent inclined surfaces extending from the open end of the opening, and the at least one accommodating cavity includes an inner surface to mate with the two inclined surfaces.

13. The connector of claim 12, wherein the at least one fixing structure further includes a guide groove formed between the two inclined surfaces and the upper casing includes a guide post adapted to be inserted into the guide groove.

14. The connector of claim 1, wherein the upper casing includes a first casing part and a second casing part, the first casing part cooperating with one of the pair of piercing portions of the conductive terminal, the second casing part cooperating with the other one of the pair of piercing portions of the conductive terminal.

15. The connector of claim 14, wherein the first casing part and the second casing part are integrally formed.

16. A connector, comprising:

a first casing defining an aperture sized to receive a first wire;

a second casing movable engageable with the first casing; and a conductive terminal disposed between the first casing and the second casing and adapted to pierce an outer insulation of the first wire arranged through the aperture to electrically connect to a conductor of the first wire as the first casing is moved toward the second casing, the conductive terminal including:

a body; and a pair of piercing portions extending upward from opposite sides of the body, each pair of piercing portions including a pair of piercing pieces and a piercing clip slot formed between the pair of piercing pieces, a first one of the pair of piercing portions adapted to tear the outer insulation of the first wire, and a second one of the pair of piercing portions adapted to tear an outer insulation of a second wire such that the first wire and the second wire are electrically connected through the conductive terminal.

17. The connector of claim 16, wherein the second casing defines:

a chamber into which the first casing is at least partially movably received; and an opening that opens toward the upper casing, the first casing movable relative to the second casing within the chamber such that the aperture and the opening at least partially overlap.

18. The connector of claim 16, wherein:

the lower casing includes a reinforcing bar;

the opening includes a first opening disposed at a first end of the lower casing and a second opening disposed at a second end of the lower casing;

the reinforcing bar is disposed adjacent to one of the first opening or the second opening; and the conductive terminal is disposed within a space formed between the first reinforcing bar and the other one of the first opening or the second opening.

19. A connector, comprising:

a housing including:

an upper casing defining an aperture through which a first wire is adapted to extend; and a lower casing defining a chamber receiving the upper casing, the chamber defining a first opening on a first end thereof in communication with the chamber and a second opening on a second end thereof in communication with the chamber, the first and second openings open in a direction toward the upper casing, the upper casing movable relative to the lower casing upon the exerting of a force on the upper casing such that the aperture and the first opening at least partially overlap; and a conductive terminal disposed in the chamber of the lower casing and adapted to tear an outer insulation of the first wire arranged within the chamber and through the first opening and to tear an outer insulation of a second wire arranged within the chamber through the second opening to electrically connect to a conductor of the first wire with a conductor of the second wire as the upper casing is moved toward the lower casing.

20. The connector of claim 19, wherein the conductive terminal comprises:

a body; and a pair of piercing portions extending upward from opposite sides of the body respectively, each of the pair of piercing portions includes:

a pair of piercing pieces; and a piercing clip slot formed between the pair of piercing pieces to tear the outer insulation of one of the first wire or the second wire.

* * * * *